Patented Jan. 21, 1930

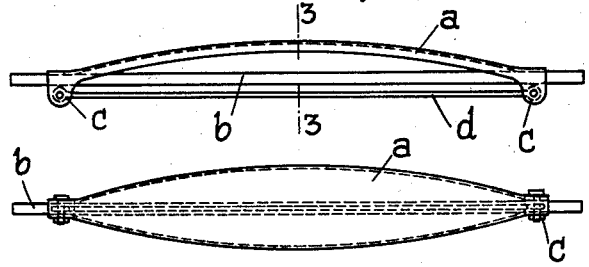
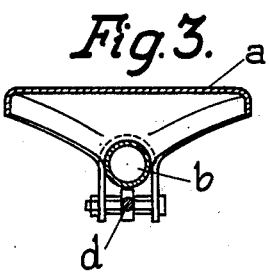
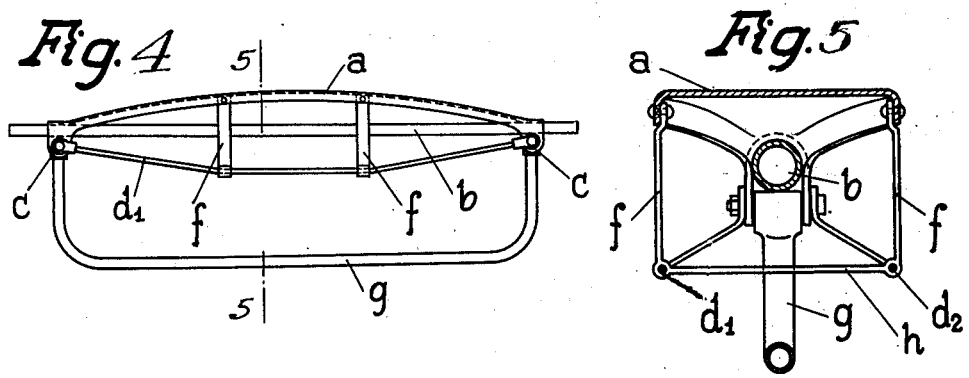

1,744,531

UNITED STATES PATENT OFFICE

JULIUS FISCHER DE TÓVÁROS, OF BUDAPEST, HUNGARY

SLIDING CURRENT COLLECTOR FOR OVERHEAD CONDUCTORS OF ELECTRIC RAILWAYS

Application filed May 16, 1928. Serial No. 278,310.

This invention relates to a sliding current collector for overhead conductors of electric railways, and more particularly to pivotally journalled current collectors consisting of a plane or bow-shaped sheet metal plate.

The object of the invention is to secure the rigidity of the collector plate at minimum weight that is, to prevent the bending of the central part of a collector plate made of a comparatively very thin sheet metal under the pressure exerted on the overhead conductor by the collector.

The annexed drawing shows several examples of construction of the current collector according to this invention.

Fig. 1 is a longitudinal elevation of a bow-shaped collector;

Fig. 2 is a plan view thereof and

Fig. 3 a cross section on a larger scale according to line 3—3 of Fig. 1: and

Figs. 4 and 5 show a collector provided with a balancing bow, in side elevation and in enlarged cross section on line 5—5 of Fig. 4, respectively.

According to my invention the ends of the collector plate are connected with each other by drawing members arranged in such a manner that the distance of said drawing members from the contact surface of said collector plate increases towards the center part of the collector plate.

With reference to Figs. 1–3, —a— is a bow-shaped collector plate of thin sheet metal pivotally or tiltably journalled on a spindle —b—. The ends —c, c— of the collector plate are connected with each other by means of a span wire —d— forming, as a chord of the bow —a—, a drawing member; the points at which the span wire is secured to the collector plate being situated preferably below the spindle —b— of the collector plate. The distance of the span wire —b— from the contact surface of the collector plate —a— increases from the ends —c, c— of the plate towards the center part of this latter.

This structure allows the thickness of the sheet metal of the collector plate to be decreased to a fairly small value without endangering the rigidity of the collector bow. If, however, the length of the bow is considerable and it is desired to reduce further the thickness of the collector plate, it is advisable to provide stays between the span wire and the central section of the collector bow.

According to Figs. 4 and 5, separate span wires —$d_1$— and —$d_2$— are provided below the longitudinal edges of the collector plate —a—, and two stays —f— are arranged on each span wire.

Each pair of opposite stays —f— is preferably united by a horizontal junction piece —h— to a stirrup. The structure —$d_1$—, —$d_2$—, —f—, —h—, forms part of a balancing weight, the other part of which is formed by a bow or frame —g— secured to the ends —c, c— of the collector bow —a—.

Having now particularly described and ascertained the nature of my said invention and in what manner the same is to be performed, I declare that what I claim is:

1. In a sliding current collector, a sheet metal collector plate, a support whereon said plate is pivotally mounted at its ends, and a drawing member below said collector plate acting to approach the pivoted ends thereof and arranged in such a manner that the distance between said drawing member and the contact surface of said collector plate increases from the ends towards the middle portion of the plate.

2. In a sliding current collector, a bow-shaped, pivotally mounted sheet metal collector plate, and a drawing member spanning said plate and connected to the ends thereof.

3. In a sliding current collector, a bow-shaped, pivotally mounted sheet metal collector plate, and a drawing member spanning said plate and connected to the ends thereof at points situated below the pivot axis of said plate.

4. In a sliding current collector, a sheet metal collector plate, a support whereon said plate is pivotally mounted at its ends, a span wire below said collector plate acting to approach the pivoted ends thereof and arranged in such a manner that the distance between said span wire and the contact surface of said collector plate increases from the ends towards the middle portion of the plate.

5. In a sliding current collector, a bow-shaped, pivotally-mounted sheet metal collector plate, and a span wire connected to the ends of said collector plate.

6. In a sliding current collector, a bow-shaped, pivotally-mounted sheet metal collector plate, and a span wire connected to the ends of said collector plate at points situated below the pivot axis of the plate.

7. In a sliding current collector, a pivotally-mounted sheet metal collector plate, a depending bow-shaped balancing weight attached to the ends of said plate, and a spanning member adapted to draw together the ends of said balancing weight.

8. In a sliding current collector, a pivotally-mounted sheet metal collector plate, a depending bow-shaped balancing weight attached to the ends of said collector, a spanning member adapted to draw together the ends of said balancing weight, and stays between said spanning member and said collector plate substantially at their middle portions.

In testimony whereof I affix my signature.

JULIUS FISCHER de TÓVÁROS.